(12) United States Patent
Nakashima et al.

(10) Patent No.: US 12,378,436 B2
(45) Date of Patent: Aug. 5, 2025

(54) SANITARY FACILITY AND METHOD FOR MANUFACTURING SANITARY FACILITY

(71) Applicants: LIXIL Corporation, Tokyo (JP); NIPPON PAINT AUTOMOTIVE COATINGS CO., LTD., Osaka (JP)

(72) Inventors: Yusuke Nakashima, Tokyo (JP); Takahito Nakase, Tokyo (JP); Yusuke Sato, Tokyo (JP); Yugo Takemoto, Hirakata (JP); Kiyoe Maejima, Hirakata (JP)

(73) Assignees: LIXIL CORPORATION, Tokyo (JP); NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 554 days.

(21) Appl. No.: 17/910,089

(22) PCT Filed: Mar. 12, 2021

(86) PCT No.: PCT/JP2021/010197
§ 371 (c)(1),
(2) Date: Sep. 8, 2022

(87) PCT Pub. No.: WO2021/182630
PCT Pub. Date: Sep. 16, 2021

(65) Prior Publication Data
US 2023/0103465 A1    Apr. 6, 2023

(30) Foreign Application Priority Data

Mar. 13, 2020  (JP) ................. 2020-044438

(51) Int. Cl.
C09D 183/10    (2006.01)
C08G 77/442    (2006.01)
C09D 5/00    (2006.01)

(52) U.S. Cl.
CPC ......... *C09D 183/10* (2013.01); *C08G 77/442* (2013.01); *C09D 5/00* (2013.01)

(58) Field of Classification Search
CPC .......... A47K 1/04; A47K 3/02; C08G 77/442; C09D 183/10; C09D 5/00; E03D 11/02
See application file for complete search history.

(56) References Cited

U.S. PATENT DOCUMENTS

| | | | |
|---|---|---|---|
| 4,617,124 | A | 10/1986 | Pall et al. |
| 6,716,513 | B1 | 4/2004 | Hasuo et al. |
| 9,034,464 | B2 | 5/2015 | Okazaki |
| 2010/0200207 | A1 | 8/2010 | Fukuda et al. |

FOREIGN PATENT DOCUMENTS

| | | |
|---|---|---|
| CN | 103025766 | 4/2013 |
| JP | 59-29016 | 2/1984 |
| JP | 2000-279331 | 10/2000 |
| JP | 2002-80830 | 3/2002 |
| JP | 2009-256575 | 11/2009 |
| JP | 2010-99097 | 5/2010 |
| WO | 00/53689 | 9/2000 |

OTHER PUBLICATIONS

International Preliminary Report on Patentability and Written Opinion of the International Searching Authority issued Sep. 6, 2022 in International (PCT) Application No. PCT/JP2021/010197.
Office Action issued Mar. 25, 2025 in Japanese Patent Application No. 2022-506858, with English-language Translation.
International Search Report (ISR) issued May 25, 2021 in International (PCT) Application No. PCT/JP2021/010197.

*Primary Examiner* — Anthony J Green
(74) *Attorney, Agent, or Firm* — Wenderoth, Lind & Ponack, L.L.P.

(57) ABSTRACT

Provided is a means for imparting hydrophilicity to a surface of a sanitary facility by means other than hydrophilic particles. A sanitary facility having a hydrophilized organic surface, wherein the hydrophilized organic surface has at least an organic cationic group, and a zeta potential at pH=7 of the hydrophilized organic surface is more than −40 mV.

14 Claims, No Drawings

SANITARY FACILITY AND METHOD FOR MANUFACTURING SANITARY FACILITY

TECHNICAL FIELD

The present invention relates to a sanitary facility having a hydrophilized organic surface.

BACKGROUND ART

Conventionally, various surface treatments have been applied to sanitary facilities such as toilet bowls, washbowls, and bathtubs in order to facilitate cleaning of soil on the surface.

For example, WO 00/53689 (Patent Literature 1) describes a hydrophilic material having at least a substrate and a hydrophilic layer formed as the outermost layer on the substrate. The hydrophilic layer comprises at least hydrophilic metal oxide particles and a hydrophilic inorganic amorphous material. Since the hydrophilic layer is present as the outermost layer, a specific uneven structure is formed on the surface of the hydrophilic material. Patent Literature 1 describes that the above configuration affords a technical effect of being less prone to allow a water droplet and soil to adhere while maintaining film hardness and durability.

JP-A-2002-80830 (Patent Literature 2) also describes a hydrophilic material comprising at least a substrate and a hydrophilic layer formed as the outermost layer on the substrate. The hydrophilic layer comprises at least a coating film-forming element made of alumina particles and amorphous silica. Some of the alumina particles are exposed on the surface, and characteristically, a surface roughness of the hydrophilic layer at any 5 µm square measured by an atomic force microscope is 5 to 35 nm.

CITATIONS LIST

Patent Literature

Patent Literature 1: WO 00/53689
Patent Literature 2: JP-A-2002-80830

SUMMARY OF INVENTION

Technical Problems

Both of Patent Literature 1 and 2 are characterized in that hydrophilic metal oxide particles, alumina particles, or the like are contained in the hydrophilic layer of the hydrophilic material, whereby a specific uneven shape is formed on the surface of the hydrophilic layer, whereby a high hydrophilic effect is exhibited. However, in the case of developing the hydrophilic effect using such particles, for example, there may be a problem that the particles used are not uniformly dispersed. In order to uniformly disperse the particles in the composition, for example, it is necessary to control and adjust the viscosity of the composition. If the particles are aggregated without being uniformly dispersed, the uneven shape on the surface may deviate from a desired range, and desired surface performance may not be obtained. Furthermore, when the uneven shape of the surface is provided by particles, the particles on the surface may fall off due to a time lapse or a physical external force.

The present invention solves the existing problems described above, and an object thereof is to provide a means for imparting hydrophilicity to a surface by means other than hydrophilic particles.

Solutions to Problems

In order to solve the above-described problems, the present invention provides the following embodiments.

[1]
A sanitary facility having a hydrophilized organic surface, wherein
the hydrophilized organic surface has at least an organic cationic group, and
a zeta potential at pH=7 of the hydrophilized organic surface is more than −40 mV.

[2]
The sanitary facility according to [1], wherein the hydrophilized organic surface has a static contact angle of water of 40° or less.

[3]
The sanitary facility according to [1] or [2], wherein the hydrophilized organic surface has a static contact angle of water of 40° or less after being brought into contact with an aqueous solution containing a cationic surfactant and then washed with water.

[4]
The sanitary facility according to any one of [1] to [3], wherein the organic cationic group of the hydrophilized organic surface is a group bonded to a carbon atom constituting the hydrophilized organic surface.

[5]
The sanitary facility according to any one of [1] to [4], wherein
the hydrophilized organic surface has an organic cationic group and an organic anionic group, and
each of the organic cationic group and the organic anionic group is a group bonded to a carbon atom constituting the hydrophilized organic surface.

[6]
The sanitary facility according to any one of [1] to [5], wherein the organic cationic group is a quaternary ammonium cationic group.

[7]
The sanitary facility according to [5], wherein
the organic cationic group is a quaternary ammonium cationic group, and
the organic anionic group is at least one of a sulfonic acid group and an alkali metal salt of a sulfonic acid group.

[8]
The sanitary facility according to any one of [1] to [7], wherein
a zeta potential $E_i$ (mV) at pH=7 of the hydrophilized organic surface and
a zeta potential $E_c$ (mV) at pH=7 after being brought into contact with an aqueous solution containing a cationic surfactant and then washed with water, satisfy a relationship represented by the following formula:

$$=E_c - E_i = <50$$

[9]
A hydrophilizing treatment agent set for manufacturing the sanitary facility according to any one of [1] to [8], wherein
the hydrophilizing treatment agent set comprises:
a first treatment agent comprising a silane coupling agent having a radical reactive group; and
a second treatment agent comprising an anionic compound having a radical reactive group and an organic anionic group, and a cationic compound having a radical reactive group and an organic cationic group.

[10]
The hydrophilizing treatment agent set according to [9], wherein
the organic anionic group is at least one of a sulfonic acid group and an alkali metal salt of a sulfonic acid group, and
the organic cationic group is a quaternary ammonium cationic group.

[11]
The hydrophilizing treatment agent set according to [9] or [10], wherein
the radical reactive group of the silane coupling agent, the radical reactive group of the anionic compound, and the radical reactive group of the cationic compound are each independently at least one selected from among an acrylamide group, an acryloyl group, a methacryloyl group, an allyl group, a vinyl group, a styryl group, and a mercapto group.

[12]
A method for manufacturing the sanitary facility according to any one of [1] to [8], the method comprising the following steps:
a first treatment agent application step of applying a first treatment agent comprising a silane coupling agent having a radical reactive group to a surface of an article to be coated, and
a second treatment agent application step of applying a second treatment agent comprising an anionic compound having a radical reactive group and an organic anionic group, and a cationic compound having a radical reactive group and an organic cationic group to the surface to which the first treatment agent has been applied.

[13]
The method for manufacturing according to [12], wherein
the organic anionic group is at least one of a sulfonic acid group and an alkali metal salt of a sulfonic acid group, and
the organic cationic group is a quaternary ammonium cationic group.

[14]
The method for manufacturing according to [12] or [13], further comprising a radical reaction acceleration step of applying heat or an active energy ray after the second treatment agent application step.

Advantageous Effects of Invention

The hydrophilized organic surface of the sanitary facility of the present invention has hydrophilicity by means other than the presence of hydrophilic particles on the surface. The hydrophilized organic surface has good hydrophilicity, and therefore has good soil guard performance. The hydrophilized organic surface further has the advantage of being superior in durability of such soil guard performance.

DESCRIPTION OF EMBODIMENTS

Hydrophilized Organic Surface

In the following, a sanitary facility having a hydrophilized organic surface will be described. The hydrophilized organic surface is characterized in that it has at least an organic cationic group and the zeta potential of the hydrophilized organic surface at pH=7 is more than −40 mV.

The hydrophilized organic surface continuously exhibits good hydrophilicity due to having a zeta potential of more than −40 mV at pH=7. Commonly used detergents contain a cationic surfactant. When the zeta potential of an initial hydrophilized organic surface is more than −40 mV, the cationic surfactant is less likely to be adsorbed. Therefore, the increase in contact angle is suppressed over a long period of time. In addition, one of the characteristics of the hydrophilized organic surface is that the surface having the zeta potential has an organic cationic group. The hydrophilized organic surface has a zeta potential at pH=7 of preferably more than −40 mV and not more than 40 mV, more preferably more than −40 mV and not more than 20 mV, even more preferably more than −40 mV and not more than 0 mV, and particularly preferably −35 mV or more and not more than 0 mV. In this range, mineral components (scale) that may be contained in tap water, such as calcium, are easily removed.

In the present description, the zeta potential of the hydrophilized organic surface can be measured using a commercially available zeta electrometer (for example, a laser zeta electrometer).

When the zeta potential of the hydrophilized organic surface at pH=7 satisfies the above condition, there is an advantage that good hydrophilicity is exhibited. In particular, when the zeta potential of the hydrophilized organic surface at pH=7 satisfies the above condition, it is possible to suppress a significant increase in the zeta potential of the surface after the hydrophilized organic surface is brought into contact with an aqueous solution containing a cationic surfactant. Furthermore, it is possible to suppress a significant increase in zeta potential after the hydrophilized organic surface is brought into contact with an aqueous solution containing a cationic surfactant and then washed with water. As a result, for example, even when an aqueous solution containing a cationic surfactant comes into contact with the hydrophilized organic surface, there is an advantage that good hydrophilicity is maintained over a long period of time.

For example, it is preferable that the zeta potential $E_i$ (mV) at pH=7 of the hydrophilized organic surface and the zeta potential $E_c$ (mV) at pH=7 after being brought into contact with an aqueous solution containing a cationic surfactant and then washed with water, satisfy the relationship of $|E_c - E_i| < 50$. This means that the range of increase in zeta potential $E_c$ at pH=7 after bringing into contact with the aqueous solution containing the cationic surfactant and then washing with water (that is, the zeta potential after bringing the hydrophilized organic surface into contact with the cationic surfactant and then washing with water) is smaller than the zeta potential $E_i$ of the hydrophilized organic surface at pH=7 (that is, the zeta potential before bringing the hydrophilized organic surface into contact with an aqueous solution containing a cationic surfactant), and the difference in potential values between $E_c$ and $E_i$ is small. The small potential increase makes it easier to maintain good hydrophilicity over a long period of time, for example, even when an aqueous solution containing a cationic surfactant comes into contact with the hydrophilized organic surface.

In the aqueous solution containing the cationic surfactant, the concentration of the cationic surfactant is 0.0001% by mass or more and 70% by mass or less. This aqueous solution is brought into contact with the hydrophilized organic surface in an amount of 40 mg per 1 $cm^2$ of the hydrophilized organic surface at room temperature (20° C. or higher and 25° C. or lower). The contact time is 5 seconds or more and 20 seconds or less. In the case of further washing with water, the hydrophilized organic surface is exposed to a water flow of 3 liters (L)/minute or more and 7 L/minute or less for 15 seconds or more and 60 seconds or less.

The static contact angle of water on the hydrophilized organic surface is preferably 40° or less. The contact angle of water on the hydrophilized organic surface can be measured in accordance with JIS R 3257 "Testing method of wettability of glass substrate" (as the type of testing method, the sessile drop method is adopted) using a commercially available contact angle meter. When the static contact angle of water is 40° or less, it can be said that the hydrophilized organic surface has hydrophilicity. The static contact angle of water on the hydrophilized organic surface is more preferably 30° or less, and particularly preferably 25° or less.

The static contact angle of water on the hydrophilized organic surface after being brought into contact with an aqueous solution containing a cationic surfactant and then washed with water is also preferably 40° or less. The static contact angle referred to herein is a static contact angle of water in a state where the zeta potential Ec is measured. That the contact angle of water is 40° or less in this state means that the hydrophilicity of the surface is well maintained even when the aqueous solution containing the cationic surfactant is brought into contact with the surface and then washed with water.

Hydrophilizing Treatment Agent Set

The hydrophilized organic surface can be formed by using a hydrophilizing treatment agent set comprising, for example, a first treatment agent comprising a silane coupling agent having a radical reactive group, and a second treatment agent comprising a cationic compound having a radical reactive group and an organic cationic group, and an anionic compound having a radical reactive group and an organic anionic group.

For example, the hydrophilized organic surface can be obtained using the hydrophilizing treatment agent set by applying the first treatment agent to a surface of a substrate (a first treatment agent application step), and then applying the second treatment agent to the surface to which the first treatment agent has been applied (a second treatment agent application step). In the following, the hydrophilizing treatment agent set will be described in detail.

First Treatment Agent

The first treatment agent constituting the hydrophilizing treatment agent set comprises a silane coupling agent having a radical reactive group. The silane coupling agent having a radical reactive group is a compound having both a reactive silyl group and a radical reactive group in the molecule. Examples of the reactive silyl group include a group that generates a silanol group by hydrolysis. Specific examples of the reactive silyl group include trialkoxysilyl groups (the number of the carbon atoms contained in each of the alkoxy groups is preferably 1 to 7) and dialkoxyalkyl groups (the number of the carbon atoms contained in each of the alkoxy groups is preferably 1 to 7, and the number of the carbon atoms contained in the alkyl group is preferably 1 to 7), and more specific examples include a trimethoxysilyl group, a triethoxysilyl group, a tripropoxysilyl group, a tris(2-methoxyethoxy)silyl group, dimethoxyalkylsilyl groups, diethoxyalkylsilyl groups, dipropoxyalkylsilyl groups, and bis(2-methoxyethoxy)alkylsilyl groups (the alkyl groups each may be a linear or branched alkyl group having 1 to 7 carbon atoms).

Examples of the radical reactive group include an acrylamide group, an acryloyl group, a methacryloyl group, an allyl group, a vinyl group, a styryl group, and a mercapto group. Of these radical reactive groups, only a single type may be contained or two or more types may be contained.

Specific examples of the silane coupling agent include:
vinyl triethoxy silane,
vinyl trimethoxy silane,
vinyl tris(2-methoxyethoxy) silane,
vinyl methyl dimethoxy silane,
p-styryl trimethoxy silane,
p-styryl triethoxy silane,
3-methacryloxypropyl triethoxy silane,
3-methacryloxypropyl trimethoxy silane,
3-methacryloxypropyl methyl dimethoxy silane,
3-methacryloxypropyl methyl diethoxy silane,
3-acryloxypropyl trimethoxy silane,
3-mercaptopropyl methyl dimethoxy silane,
3-mercaptopropyl trimethoxy silane,
3-mercaptopropyl triethoxy silane, and
3-octanoylthio-1-propyl triethoxy silane.

As the silane coupling agent having a radical reactive group, only one silane coupling agent may be used alone, or two or more silane coupling agents may be used in combination.

As the silane coupling agent having a radical reactive group, a silane coupling agent having two or more radical reactive groups may be used. The use of such a silane coupling agent offers the advantage that the durability of the soil guard performance can be further improved.

As the silane coupling agent, a commercially available product may also be used. As a commercially available product, for example, various silane coupling agents available from Shin-Etsu Chemical Co., Ltd., Momentive Performance Materials Inc., Toagosei Co., Ltd., Asahi Kasei Corp., etc. can be used.

It is considered that when the silane coupling agent having a radical reactive group is used, a silanol group generated by hydrolysis of a reactive silyl group undergoes a bonding reaction to the surface of a substrate.

The amount of the silane coupling agent contained in the first treatment agent is preferably in a range of 0.1 parts by mass or more and 10 parts by mass or less, and more preferably in a range of 1 part by mass or more and 5 parts by mass or less, based on 100 parts by mass of the first treatment agent.

The first treatment agent may comprise a catalyst in combination with the silane coupling agent. Examples of the catalyst include acidic catalysts (e.g., an aqueous hydrochloric acid solution, an aqueous sulfuric acid solution, an aqueous nitric acid solution, an aqueous phosphoric acid solution, and an aqueous solution of a compound having a carboxylic acid such as formic acid, acetic acid, or propionic acid) and basic catalysts (e.g., an aqueous ammonia solution, morpholine, N-methyl morpholine, N-ethyl morpholine, piperazine, hydroxyethyl piperazine, 2-methyl piperazine, trans-2,5-dimethyl piperazine, cis-2,6-dimethyl piperazine, triethylamine, N,N-dimethyl ethanol amine, N,N-diethyl ethanol amine, N-(β-aminoethyl)ethanol amine, N-methyl diethanol amine, N-n-butyl ethanol amine, N-n-butyl diethanol amine, N-t-butyl ethanol amine, N-t-butyl diethanol amine, N-(β-aminoethyl)isopropanol amine, N,N-diethyl isopropanol amine, 2-amino-2-methyl-1-propanol, an aqueous sodium hydroxide solution, and an aqueous potassium hydroxide solution).

The first treatment agent may comprise various solvents, various additives, and the like, as necessary. Examples of a preferable solvent include water, methanol, ethanol, isopropyl alcohol, and n-propyl alcohol. Examples of the additive include a surface conditioning agent, a compatibilizer, a leveling agent, a plasticizer, an antifoaming agent, an ultraviolet absorber, an antioxidant, and a rheology modifier. Of these additives, only a single type may be contained or two or more types may be contained.

The first treatment agent can be prepared by mixing the silane coupling agent having a radical reactive group and other necessary components by a method commonly used by those skilled in the art.

Second Treatment Agent

The second treatment agent constituting the hydrophilizing treatment agent set preferably comprises an anionic compound having a radical reactive group and an organic anionic group, and a cationic compound having a radical reactive group and an organic cationic group. As a result, the organic anionic group and the organic cationic group can be introduced to a substrate, so that a surface that exhibits hydrophilicity is formed.

Examples of the radical reactive group of the anionic compound include at least one selected from the group consisting of an acrylamide group, an acryloyl group, a methacryloyl group, an allyl group, a vinyl group, a styryl group, and a mercapto group. Examples of the radical reactive group of the cationic compound include at least one selected from the group consisting of an acrylamide group, an acryloyl group, a methacryloyl group, an allyl group, a vinyl group, a styryl group, and a mercapto group.

The anionic compound and the cationic compound may have a condensation type reactive group instead of a radical reactive group. Examples of the condensation type reactive group include at least one selected from the group consisting of a carboxy group, a hydroxy group, an amino group, an epoxy group, a ureido group, an isocyanate group, and an isocyanurate group.

Examples of the organic anionic group of the anionic compound include a sulfonic acid group and an alkali metal salt of a sulfonic acid group. Of these, only a single type may be contained or two or more types may be contained. The term "organic anionic group" in the present description means an anionic group which an organic compound has. The term "organic anionic group" in the present description is used for the sake of distinguishing it from anionic groups contained in inorganic compounds. When the second treatment agent contains the anionic compound, a hydrophilized organic surface to be formed has an organic anionic group. The organic anionic group is bonded to a carbon atom (specifically, a carbon atom contained in the anionic compound) constituting the hydrophilized organic surface. Since the anionic compound is bonded to the substrate via the silane coupling agent, the anionic compound is hardly detached even by frequent washing with water or the like. Therefore, the hydrophilicity is easily exhibited over a long period of time.

Preferably, the anionic compound does not have any hydrophilic portion other than ends of the molecular chain. The "hydrophilic portion" in the anionic compound means a sulfonic acid group or the like of the anionic compound and other hydrophilic groups. When the anionic compound has such a structure, the hydrophilic group of the anionic compound can be concentrated on the surface of a coating film that is not on the substrate side, which is advantageous in that sufficient washing property and washing durability can be imparted even when the anionic compound is used for members that are frequently washed with water, such as sanitary facilities.

Specific examples of the anionic compound include:
sodium vinylsulfonate,
vinylsulfonic acid,
lithium N-t-butylacrylamide sulfonate,
sodium N-t-butylacrylamide sulfonate,
potassium N-t-butylacrylamide sulfonate,
2-sodium sulfoethyl methacrylate,
sodium allylsulfonate,
sodium p-styrenesulfonate,
sodium sulfonate-containing urethane acrylate, and
N-t-butylacrylamide sulfonic acid.

As the anionic compound, only one anionic compound may be used singly, or two or more anionic compounds may be used in combination. The anionic compound may be neutralized by adding an aqueous solution of an alkali metal hydroxide, such as sodium hydroxide and potassium hydroxide, to form a sulfonate salt.

A commercially available product may be used as the anionic compound. Examples of the commercially available product include ATBS(registered trademark)—Na available from Toagosei Co., Ltd., N-SVS-25 available from Asahi Kasei Finechem Co., Ltd., ANTOX MS-2N available from Nippon Nyukazai Co., Ltd., and SPINOMER(registered trademark) NaSS available from Tosoh Organic Chemical Co., Ltd. The anionic compound may also be prepared by a commonly used method. For example, sodium sulfonate-containing urethane acrylate and the like can be prepared by a technique commonly used by those skilled in the art.

The anionic compound preferably has a number average molecular weight of 70 or more and 500 or less. When the number average molecular weight is within the above range, there is an advantage that hydrophilicity can be more favorably imparted.

Cationic Compound

Examples of the organic cationic group of the cationic compound include a quaternary ammonium cationic group. The term "organic cationic group" in the present description means a cationic group which an organic compound has. The term "organic cationic group" in the present description is used for the sake of distinguishing it from cationic groups contained in inorganic compounds. When the second treatment agent contains the cationic compound, a hydrophilized organic surface to be formed has an organic cationic group. The organic cationic group is bonded to a carbon atom (specifically, a carbon atom contained in the cationic compound) constituting the hydrophilized organic surface. Since the cationic compound is bonded to the substrate via the silane coupling agent, the cationic compound is hardly detached even by frequent washing with water or the like. Therefore, the hydrophilicity is easily exhibited over a long period of time.

The condition that the second treatment agent constituting the hydrophilizing treatment agent set contains the cationic compound in addition to the anionic compound offers the advantage that good soil guard property and good durability of soil guard performance can be obtained. Although not being bound by a specific theory, it is considered that when the cationic compound is contained in addition to the anionic compound, it is possible to effectively prevent a basic washing component such as a quaternary ammonium salt which may be contained in, for example, a commercially available detergent, from being ionically bonded to a sulfonic acid or the like derived from the anionic compound, thereby improving the durability of the soil guard performance.

Preferably, the cationic compound does not have any hydrophilic portion other than ends of the molecular chain. The "hydrophilic portion" in the cationic compound means a quaternary ammonium cationic group of the cationic compound and other hydrophilic groups. When the cationic compound has such a structure, the hydrophilic group of the cationic compound can be concentrated on the surface of a coating film that is not on the substrate side, which is advantageous in that sufficient washing property and washing durability can be imparted even when the cationic compound is used for members that are frequently washed with water, such as sanitary crockery.

Specific examples of the cationic compound include:
(3-acrylamidopropyl)trimethyl ammonium chloride,
(3-acrylamidopropyl)trimethyl ammonium bromide, [3-(methacryloylamino)propyl]trimethyl ammonium chloride,
2-(acryloyloxy)-N,N,N-trimethyl ethane aminium chloride, and
2-(methacryloyloxy)ethyl trimethyl ammonium chloride.

As the cationic compound, only one cationic compound may be used alone, or two or more cationic compounds may be used in combination.

A commercially available product may be used as the cationic compound. The cationic compound may also be prepared by a commonly used method.

The cationic compound preferably has a number average molecular weight of 70 or more and 500 or less. When the number average molecular weight is within the above range, there is an advantage that hydrophilicity can be more favorably imparted.

The mass ratio of the anionic compound to the cationic compound contained in the second treatment agent is preferably anionic compound:cationic compound=15:85 to 85:15, and more preferably 20:80 to 80:20. When the ratio is within the above range, there is an advantage that good durability of the soil guard performance can be obtained.

When the anionic compound and the cationic compound each have a radical reactive functional group, where an average value of the number of carbon atoms existing between the radical reactive functional group and the anionic group (representatively, a sulfonic acid group) in the anionic compound is expressed by ($n_1$), and an average value of the number of carbon atoms existing between the radical reactive functional group and the organic cationic group (representatively, a quaternary ammonium cationic group) in the cationic compound is expressed by ($n_2$), the ($n_1$) and the ($n_2$) preferably have a relationship of $$(n_2)>(n_1).$$

When the average number of carbon atoms ($n_1$) and the average number of carbon atoms ($n_2$) have the relationship of ($n_2$)>($n_1$), it is considered that the proportion of the cationic groups of the cationic compound existing on the surface side is higher than that of the anionic groups of the anionic compound after the second treatment agent is applied and reacted to the substrate. It is considered that this makes it possible to achieve better durability of the soil guard performance. The difference between the average number of carbon atoms ($n_1$) and the average number of carbon atoms ($n_2$) is more preferably 1 or more, and even more preferably 2 or more.

Other Components

When the components contained in the first treatment agent and the second treatment agent have a radical reactive functional group, the first treatment agent and the second treatment agent preferably further comprise a radical polymerization initiator. The radical polymerization initiator is a compound that is decomposed by light or heat to generate radicals. Radical polymerization initiators are classified into photo-radical polymerization initiators that are decomposed by light and thermal radical polymerization initiators that are decomposed by heat. The radical polymerization initiator is preferably water-soluble.

Preferable examples of the photo-radical polymerization initiator include benzophenone, 1-hydroxy-cyclohexyl-phenyl-ketone, a mixture of 1-hydroxy-cyclohexyl-phenyl-ketone and benzophenone, 1-[4-(2-hydroxyethoxy)-phenyl]-2-hydroxy-2-methyl-1-propane-1-one, 2-hydroxy-2-methyl-1-phenylpropane-1-one, 2-hydroxy-1-[4-{4-(2-hydroxy-2-methyl-propionyl)-benzyl}phenyl]-2-methyl-1-propane-1-one, oxyphenylacetic acid, a mixture of 2-[2-oxo-2-phenylacetoxyethoxy]ethyl ester and oxyphenylacetic acid and/or 2-(2-hydroxyethoxy)ethyl ester, and bis(2,4,6-trimethylbenzoyl)-phenylphosphine oxide. To the photo-radical polymerization initiator may, as necessary, be added a sensitizer such as ethyl p-dimethyl aminobenzoate (KAYACURE EPA manufactured by Nippon Kayaku Co., Ltd.). As such a commercially available product, Omnirad (registered trademark) 184, Omnirad (registered trademark) 500, Omnirad (registered trademark) 2959, DAROCURE (registered trademark) 1173, Omnirad (registered trademark) 127, Omnirad (registered trademark) 754, and Omnirad (registered trademark) 819DW, available from IGM Resins B.V., can be used.

Preferable examples of the thermal radical polymerization initiator include azo compounds such as 2,2'-azobis[2-(2-imidazolin-2-yl)propane] dihydrochloride, 2,2'-azobis[2-(2-imidazolin-2-yl)propane] disulfate dihydrate, 2,2'-azobis[2-(2-imidazolin yl)propane], 2,2'-azobis(propane-2-carboamidine) dihydrochloride, 2,2'-azobis[N-(2-carboxyethyl)-2-methyl propionamidine] n-hydrate, 2,2'-azobis[2-methyl-N-(2-hydroxyethyl)propionamide], and 4,4'-azobis(4-cyanopentanoic acid), persulfate salts such as ammonium persulfate, sodium persulfate, and potassium persulfate, and peroxides such as hydrogen peroxide, cumyl perneodecanoate, 1,1,3,3-tetramethylbutyl peroxy neodecanoate, t-hexyl peroxyneodecanoate, t-butyl peroxyneodecanoate, t-hexyl peroxypivalate, and t-butyl peroxypivalate. To the thermal radical polymerization initiator may, as necessary, be added water or the like. As a commercially available product thereof, VA-044, VA-046B, VA-061, V-50, VA-057, VA-086 and V-501 manufactured by Wako Pure Chemical Industries, Ltd., PERCUMYL ND-50E, PEROCTA ND-50E, PERHEXYL ND-50E, PERBUTYL ND-50E, PERHEXYL PV-50E and PERBUTYL PV-40E manufactured by NOF CORPORATION, and reagents available from various companies can be used.

The blending amount of the radical polymerization initiator is preferably 1 part by mass or more and 75 parts by mass or less, and more preferably 5 parts by mass or more and 60 parts by mass or less, based on 100 parts by mass of the total amount (solid mass) of the anionic compound and the cationic compound contained in the second treatment agent.

The first treatment agent and the second treatment agent may comprise a solvent, as necessary. When the solvent is contained, there is an advantage that the anionic compound and the cationic compound can be dissolved or dispersed well. Examples of a preferable solvent include water, methanol, ethanol, isopropyl alcohol, and n-propyl alcohol. These solvents can be appropriately selected according to the type and content of each of the compounds described above.

The first treatment agent and the second treatment agent may comprise an additive, as necessary, in addition to the components described above. Examples of the additive include a surface conditioning agent, a compatibilizer, a leveling agent, a plasticizer, an antifoaming agent, an ultraviolet absorber, an antioxidant, and a rheology modifier. Of these additives, only a single type may be contained or two or more types may be contained.

Examples of the compatibilizer that can be used as an additive include amide compounds such as urea, melamine, acryloylmorpholine, dimethylacrylamide, dimethylaminopropylacrylamide, isopropylacrylamide, diethylacrylamide, and hydroxyethylacrylamide; aprotic polar solvents such as dimethylsulfoxide, acetonitrile, and N,N-dimethylformamide; polyhydric alcohols such as ethylene glycol, glycerin, trimethylolpropane, ditrimethylolpropane, erythritol, and dipentaerythritol; saccharides such as triose, tetrose, pentose, hexose, sedoheptulose, glucose, maltose, sucrose, lactose, cellobiose, raffinose, acarbose, oligosaccharides, cyclodextrins, dextrins, and starches; resins having polarity such as sodium carboxymethylcellulose, polyvinylpyrrolidone, sodium polyacrylate, and modified urea; and inorganic salts such as sodium hydrogen carbonate, sodium carbonate, sodium hydrogen sulfate, and sodium sulfate. The content of the compatibilizer when contained is preferably 10 parts by mass or more and 100 parts by mass or less based on 100 parts by mass of the total amount (solid mass) of the anionic compound and the cationic compound contained in the second treatment agent.

The solid concentration of the first treatment agent is preferably 0.1% by mass or more and 60% by mass or less. The solid concentration of the second treatment agent is preferably 0.1% by mass or more and 60% by mass or less. When the solid concentration is within the above range, there is an advantage that good soil guard property and the like can be obtained.

The second treatment agent may comprise a nonionic compound having a nonionic group, as necessary. Examples of the nonionic group include a hydroxyl group, an ethoxy group, and an ester group.

The nonionic compound preferably has a radical reactive group in addition to a nonionic group. Examples of the radical reactive group include at least one selected from the group consisting of an acrylamide group, an acryloyl group, a methacryloyl group, an allyl group, a vinyl group, a styryl group, and a mercapto group.

Specific examples of the nonionic compound include polyethylene glycol mono(meth)acrylate. A commercially available product may be used as the nonionic compound. Specific examples of the commercially available product include photocurable monomers having a nonionic group sold by Shin-Nakamura Chemical Co., Ltd., DKS Co. Ltd., and Kyoeisha Chemical Co., Ltd.

The second treatment agent may comprise various solvents, various additives, and the like, as necessary. Examples of a preferable solvent include water, methanol, ethanol, isopropyl alcohol, and n-propyl alcohol. Examples of the additive include a surface conditioning agent, a compatibilizer, a leveling agent, a plasticizer, an antifoaming agent, an ultraviolet absorber, an antioxidant, and a rheology modifier. Of these additives, only a single type may be contained or two or more types may be contained.

The second treatment agent can be prepared by mixing the components described above and other necessary components by a method commonly used by those skilled in the art.

Hydrophilizing Treatment Agent Set

The present disclosure also provides a hydrophilizing treatment agent set comprising the first treatment agent and the second treatment agent. This hydrophilizing treatment agent set is a set for forming a hydrophilized organic surface on a surface of a sanitary facility. Preferred embodiments of the first treatment agent and the second treatment agent are the same as those described above.

Another embodiment of the hydrophilizing treatment agent set is, for example, an embodiment in which the anionic compound and the cationic compound are stored separately from each other. These embodiments may be appropriately selected according to the storage stability and reactivity of each component.

The mass ratio of the first treatment agent to the second treatment agent in the hydrophilizing treatment agent set can be arbitrarily chosen according to the use, etc. of the target facility.

Hydrophilized Organic Surface, Sanitary Facility, and Method for Manufacture of Sanitary Facility By using the first treatment agent and the second treatment agent, or the hydrophilizing treatment agent set comprising the first treatment agent and the second treatment agent, a hydrophilized organic surface having at least an organic cationic group and having a zeta potential at pH=7 of more than −40 mV can be formed on a surface of a sanitary facility. In the hydrophilized organic surface, the zeta potential preferably satisfies the above conditions.

The present disclosure also provides a sanitary facility having the hydrophilized organic surface. Examples of the sanitary facility in the present description include a facility constituting a plumbing facility of a house, such as closet bowls, urinals, washbowls, bathtubs of a bath, tiles, mirrors, glass, enamels, siding materials, sashes, wall surfaces, ceiling surfaces, floor surfaces, protective plates, and ceramics, and components of the facility. The hydrophilic organic surface can also be provided on a surface of glass constituting a window of a house or the like.

The hydrophilized organic surface can be formed by a method comprising the following steps:

a first treatment agent application step of applying a first treatment agent comprising a silane coupling agent having a radical reactive group to a surface of an article to be coated, and a second treatment agent application step of applying a second treatment agent comprising a cationic compound having a radical reactive group and an organic cationic group and an anionic compound having a radical reactive group and an organic anionic group to the surface to which the first treatment agent has been applied. The "article to be coated" as referred to herein corresponds to a sanitary facility. By the above method, a hydrophilized organic surface can be formed in a sanitary facility.

In the above method, it is preferable to apply heat or active energy rays after the second treatment agent application step to promote a radical reaction. By performing these treatments, the durability of the hydrophilized organic surface can be further improved.

As the light irradiation, active energy rays may be applied. More specifically, active energy rays, more preferably, ultraviolet rays having a wavelength in a range of 220 to 450 nm, are applied using, for example, a high pressure mercury lamp, an ultra-high pressure mercury lamp, a metal halide lamp, an ultraviolet LED lamp, or the like. Examples of the heating condition include heating using a commonly used heating furnace, a hot air dryer, an IR heater, or the like, and heat irradiation using an infrared heat irradiation apparatus. In the heating condition, for example, the heating temperature may be 80° C. or higher and 150° C. or lower.

EXAMPLES

The present invention will be described hereafter in more detail by way of examples, to which the present invention is not intended to be limited. In the examples, "parts" and "%" are on a mass basis unless otherwise indicated.

Example 1

Preparation of First Treatment Agent

A first treatment agent was prepared by stirring and mixing 1 part by mass of 3-methacryloxypropyl trimethoxy silane (a silane coupling agent) and 98 parts by mass of 1-methoxy-2-propanol at room temperature, then adding 1 part by mass of a 3% aqueous hydrochloric acid solution, and further stirring the mixture for 30 minutes, thereby performing hydrolysis.

Preparation of Second Treatment Agent

A second treatment agent was prepared by mixing 27.5 parts by weight of ion-exchanged water and 10 parts by weight of urea, stirring them until the urea was dissolved, adding 5 parts by mass of sodium vinylsulfonate (an anionic compound), 45 parts by mass of sodium N-t-butylacrylamido sulfonate (an anionic compound), 50 parts by mass of (3-acrylamidopropyl)trimethyl ammonium chloride (a cationic compound), 50 parts by mass of 2-hydroxy-2-methyl-1-phenylpropane-1-one (a polymerization initiator), and 100 parts by mass of isopropyl alcohol, and stirring the mixture until a transparent homogeneous solution was formed.

Preparation of Hydrophilized Organic Surface

The first treatment agent obtained as described above was applied to a surface of a crockery having silicon oxide on the surface, which is a sanitary facility, dried at 60° C. for 30 minutes using an electric oven, and then left at room temperature for 30 minutes.

Subsequently, the second treatment agent prepared as described above was applied, and then subjected to ultraviolet irradiation with an energy having an integrated light quantity of 1000 mJ/cm$^2$ by using a high pressure mercury lamp. Thus, a hydrophilized organic surface was formed on the surface of the crockery.

Examples 2 to 12 and Comparative Examples 1 to 3

In Examples 2 to 12 and Comparative Examples 1 to 3, hydrophilized organic surfaces were formed respectively, in the same manner as in Example 1 except that the type of the silane coupling agent and the type and amount of the anionic compound, the cationic compound, the polymerization initiator, etc. were changed according to the following table.

The hydrophilized organic surfaces formed in the above Examples and Comparative Examples were subjected to the following evaluations. The results of the evaluations are shown in the following table.

Measurement of Zeta Potential

The zeta potential of the hydrophilized organic surface at around pH 7 was measured using a commercially available zeta electrometer, ELSZ-2000ZS (manufactured by Otsuka Electronics Co., Ltd.), and the value at pH=7 was calculated from the approximate curve of the measured result to determine the zeta potential (mV) at pH=7.

As a zeta potential, both of the following were measured:

(1) a zeta potential (Ei) after washing the hydrophilized organic surface formed in the above Examples and Comparative Examples with distilled water and drying, and (2) a zeta potential (Ec) after applying 1 ml of a SANPOLL (trade name) stock solution as a cationic surfactant on the hydrophilized organic surface, leaving it for 10 seconds, washing it with a water flow of 5 L/min for 30 seconds, and drying.

Measurement of Static Contact Angle of Water

As a standard for evaluating the durability of a hydrophilized organic surface (hydrophilizing treatment), used was a contact angle of a water droplet with respect to a surface, which was determined in accordance with JIS R 3257 "Testing method of wettability of glass substrate" (the sessile drop method was adopted as the type of the testing method).

Specifically, using DSA20E manufactured by KRÜSS GmbH, 4 μL of distilled water was dropped onto the coating film, and a contact angle (a static contact angle of water) after 60 seconds was measured.

As a static contact angle of water, both of the following were measured:

(1) a static contact angle of water after washing the hydrophilized organic surface formed in the above Examples and Comparative Examples with distilled water and drying, and (2) a static contact angle of water after applying 1 ml of a SANPOLL (trade name) stock solution as a cationic surfactant on the hydrophilized organic surface, leaving it for 10 seconds, washing it with a water flow of 5 L/min for 30 seconds, and drying (a static contact angle of water in a state where the zeta potential Ec is measured).

TABLE 1

| | | | Comparative Examples | | | Examples | | | |
| --- | --- | --- | --- | --- | --- | --- | --- | --- | --- |
| | | | 1 | 2 | 3 | 1 | 2 | 3 | 4 | 5 |
| First treatment agent | Silane coupling agent | 3-Acryloxypropyl trimethoxy silane | | | | | | | | ○ |
| | | 3-Methacryloxypropyl trimethoxy silane | ○ | ○ | ○ | ○ | ○ | ○ | ○ | |
| Second treatment agent | Anionic compound (parts by mass) | Sodium vinylsulfonate ($n_1 = 0$) | | 20 | 40 | 5 | 60 | | 65 | 25 |
| | | Sodium N-t-butylacrylamide sulfonate ($n_1 = 2$) | 100 | 80 | 50 | 45 | 10 | 50 | | |
| | | Sodium allylsulfonate ($n_1 = 1$) | | | | | | | | |
| | | N-t-Butylacrylamide sulfonic acid ($n_1 = 2$) | | | | | | | | 25 |
| | Cationic compound (parts by mass) | (3-Acrylamidopropyl)trimethyl ammonium chloride ($n_2 = 3$) | | | 10 | 50 | 30 | 50 | 35 | 50 |
| | Polymerization initiator (parts by mass) | 2-Hydroxy-2-methyl-1-phenylpropane-1-one | 50 | 50 | 50 | 50 | 50 | 50 | 50 | 50 |
| | | 1-[4-(2-Hydroxyethoxy)-phenyl]-2-hydroxy-2-methyl-1-propane-1-one | | | | | | | | |

TABLE 1-continued

| Evaluation | Zeta potential | Zeta potential Ei (mV) at pH = 7 | −50 | −48 | −40 | −31 | −27 | −18 | −12 | −11 |
|---|---|---|---|---|---|---|---|---|---|---|
| | | Zeta potential Ec (mV) after contact and water washing | −38 | −10 | 4 | 15 | −8 | 12 | −5 | 25 |
| | | \|Ec − Ei\| | 12 | 38 | 44 | 46 | 19 | 30 | 7 | 36 |
| | Water contact angle | Static contact angle of water | 7 | 10 | 9 | 7 | 10 | 7 | 19 | 13 |
| | | Static contact angle of water after contact and water washing | 70 | 71 | 73 | 8 | 25 | 7 | 31 | 11 |

|  |  |  |  | Examples ||||||| 
|---|---|---|---|---|---|---|---|---|---|---|
|  |  |  |  | 6 | 7 | 8 | 9 | 10 | 11 | 12 |
| First treatment agent | Silane coupling agent | 3-Acryloxypropyl trimethoxy silane | | | | | | | | |
| | | 3-Methacryloxypropyl trimethoxy silane | | ○ | ○ | ○ | ○ | ○ | ○ | ○ |
| Second treatment agent (parts by mass) | Anionic compound | Sodium vinylsulfonate ($n_1 = 0$) | | 5 | 20 | | 45 | 10 | 50 | |
| | | Sodium N-t-butylacrylamide sulfonate ($n_1 = 2$) | | 45 | 20 | 45 | 5 | 10 | | |
| | | Sodium allylsulfonate ($n_1 = 1$) | | | | 5 | | | | |
| | | N-t-Butylacrylamide sulfonic acid ($n_1 = 2$) | | | | | | | | |
| | Cationic compound (parts by mass) | (3-Acrylamidopropyl)trimethyl ammonium chloride ($n_2 = 3$) | | 50 | 60 | 50 | 50 | 80 | 50 | 100 |
| | Polymerization initiator (parts by mass) | 2-Hydroxy-2-methyl-1-phenylpropane-1-one | | | 50 | 50 | 50 | 50 | 50 | 50 |
| | | 1-[4-(2-Hydroxyethoxy)-phenyl]-2-hydroxy-2-methyl-1-propane-1-one | | 50 | | | | | | |
| Evaluation | Zeta potential | Zeta potential Ei (mV) at pH = 7 | | −10 | 1 | 11 | 12 | 17 | 21 | 26 |
| | | Zeta potential Ec (mV) after contact and water washing | | 10 | 46 | 34 | 46 | 23 | 49 | 35 |
| | | \|Ec − Ei\| | | 20 | 45 | 23 | 34 | 6 | 28 | 9 |
| | Water contact angle | Static contact angle of water | | 8 | 13 | 12 | 12 | 15 | 14 | 23 |
| | | Static contact angle of water after contact and water washing | | 7 | 11 | 10 | 9 | 8 | 9 | 9 |

In any of Examples, the zeta potential at pH=7 of the hydrophilized organic surface was greater than −40 mV. In these examples, it was confirmed that the static contact angle of water was 40° or less, and that the static contact angle of water after being brought into contact with an aqueous solution containing a cationic surfactant and then washed with water was also 40° or less. As a result, it was confirmed that the hydrophilized organic surfaces of Examples had high hydrophilicity, and that the hydrophilicity was maintained even after the aqueous solution containing the cationic surfactant was brought into contact with the surfaces.

In any of Comparative Examples, the zeta potential of the hydrophilized organic surface at pH=7 was −40 mV or less. It was confirmed that the hydrophilized organic surfaces in these examples had large static contact angles of water especially after being brought into contact with an aqueous solution containing a cationic surfactant, and then washed with water, and the hydrophilicity was reduced.

INDUSTRIAL APPLICABILITY

By the above disclosure, there is provided a means for imparting hydrophilicity to a surface of a sanitary facility by means other than hydrophilic particles. The hydrophilic organic surface is formed on a surface of a sanitary facility, the hydrophilic organic surface has at least an organic cationic group, and the zeta potential of the hydrophilized organic surface at pH=7 is more than −40 mV. These offer the advantage that good hydrophilicity and hydrophilicity durability are achieved.

This application claims priority based on Japanese Patent Application No. 2020-044438, which was filed in Japan on Mar. 13, 2020, the disclosure of which application is incorporated herein by reference in its entirety.

The invention claimed is:

1. A sanitary facility having a hydrophilized organic surface,
    the hydrophilized organic surface having at least an organic cationic group, and
    a zeta potential more than −40 mV at pH=7.

2. The sanitary facility according to claim 1, wherein the hydrophilized organic surface has a static contact angle of water of 40° or less.

3. The sanitary facility according to claim 1, wherein the hydrophilized organic surface has a static contact angle of water of 40° or less after being brought into contact with an aqueous solution containing a cationic surfactant and then washed with water.

4. The sanitary facility according to claim 1, wherein the organic cationic group of the hydrophilized organic surface is a group bonded to a carbon atom constituting the hydrophilized organic surface.

5. The sanitary facility according to claim 1, wherein
    the hydrophilized organic surface has an organic cationic group and an organic anionic group, and
    each of the organic cationic group and the organic anionic group is a group bonded to a carbon atom constituting the hydrophilized organic surface.

6. The sanitary facility according to claim 1, wherein the organic cationic group is a quaternary ammonium cationic group.

7. The sanitary facility according to claim 5, wherein the organic cationic group is a quaternary ammonium cationic group, and
    the organic anionic group is at least one of a sulfonic acid group and an alkali metal salt of a sulfonic acid group.

8. The sanitary facility according to claim 1, wherein
    a zeta potential Ei (mV) at pH=7 of the hydrophilized organic surface, and a zeta potential Ec (mV) at pH=7 after being brought into contact with an aqueous solution containing a cationic surfactant and then washed with water satisfy a relationship represented by a following formula:

$$|Ec-Ei| <50$$

9. A hydrophilizing treatment agent set for manufacturing the sanitary facility according to claim 1, the hydrophilizing treatment agent set comprising:
a first treatment agent comprising a silane coupling agent having a radical reactive group; and
a second treatment agent comprising:
an anionic compound having a radical reactive group and an organic anionic group, and
a cationic compound having a radical reactive group and an organic cationic group.

10. The hydrophilizing treatment agent set according to claim 9, wherein
the organic anionic group is at least one of a sulfonic acid group and an alkali metal salt of a sulfonic acid group, and
the organic cationic group is a quaternary ammonium cationic group.

11. The hydrophilizing treatment agent set according to claim 9, wherein
the radical reactive group of the silane coupling agent, the radical reactive group of the anionic compound, and the radical reactive group of the cationic compound are each independently at least one selected from among an acrylamide group, an acryloyl group, a methacryloyl group, an allyl group, a vinyl group, a styryl group, and a mercapto group.

12. A method for manufacturing the sanitary facility according to claim 1,
the method comprising:
a first treatment agent application step of applying a first treatment agent comprising a silane coupling agent having a radical reactive group to a surface of an article to be coated, and
a second treatment agent application step of applying a second treatment agent comprising an anionic compound having a radical reactive group and an organic anionic group and a cationic compound having a radical reactive group and an organic cationic group to the surface to which the first treatment agent has been applied.

13. The method for manufacturing according to claim 12, wherein
the organic anionic group is at least one of a sulfonic acid group and an alkali metal salt of a sulfonic acid group, and
the organic cationic group is a quaternary ammonium cationic group.

14. The method for manufacturing according to claim 12, further comprising a radical reaction acceleration step of applying heat or an active energy ray after the second treatment agent application step.

* * * * *